United States Patent [19]

Snoeren

[11] Patent Number: 5,774,269
[45] Date of Patent: Jun. 30, 1998

[54] IMAGE PICK-UP APPARATUS

[75] Inventor: Rudolph M. Snoeren, Eindhoven, Netherlands

[73] Assignee: U.S. Philips Corporation, New York, N.Y.

[21] Appl. No.: 618,230

[22] Filed: Mar. 19, 1996

[30]     Foreign Application Priority Data

Mar. 21, 1995 [EP]   European Pat. Off. ............. 95200682

[51] Int. Cl.$^6$ .................................................. G02B 27/14
[52] U.S. Cl. ........................................... 359/636; 359/629
[58] Field of Search .................................... 359/636, 629

[56]            References Cited

U.S. PATENT DOCUMENTS

| | | | |
|---|---|---|---|
| 4,246,607 | 1/1981 | Vijverberg | 358/11 |
| 4,413,352 | 11/1983 | Nishio | 378/42 |
| 4,670,896 | 6/1987 | Klausz | 378/156 |
| 4,733,352 | 3/1988 | Daniele et al. | 346/108 |
| 4,907,252 | 3/1990 | Aichinger et al. | 378/99 |
| 5,313,542 | 5/1994 | Castonguay | 385/115 |
| 5,434,902 | 7/1995 | Bruijns | 378/98.7 |

FOREIGN PATENT DOCUMENTS

| | | |
|---|---|---|
| 893132373 | 6/1990 | European Pat. Off. . |
| 3315882 | 11/1984 | Germany . |
| 54-158984 | 12/1979 | Japan . |

*Primary Examiner*—Georgia Y. Epps
*Assistant Examiner*—Thomas Robbins
*Attorney, Agent, or Firm*—Jack D. Slobod

[57]            ABSTRACT

An image pick-up apparatus (1) which includes a beam splitter (2) for splitting an image into sub-images and several image sensors (3, 4) for picking up the sub-images is provided with a depolarizing element (6) for reducing the linear polarization degree of the light incident on the beam splitter. The electronic image signals of the image sensors (3, 4) are combined so as to form an electronic image signal of a composite image in a combination unit (5). Because the linear polarization degree of the light incident on a mirror surface (27) of the beam splitter (2) is low, the differences between brightnesses of sub-images picked up by individual image sensors are small. Disturbances are thus counteracted in the composite image.

The image pick-up apparatus is preferably used in an X-ray examination apparatus (10) in order to reproduce an X-ray image having a high spatial resolution and few disturbances.

15 Claims, 2 Drawing Sheets

IMAGE PICK-UP APPARATUS

BACKGROUND OF THE INVENTION

1. Field of Invention

The invention relates to an image pick-up apparatus, including a beam splitter for splitting a light beam into sub-beams carrying sub-images, at least two image sensors for deriving electronic sub-image signals from the sub-images, and a combination unit for combining electronic sub-image signals so as to form an electronic image signal of a composite image.

The invention also relates to an X-ray examination apparatus comprising such an image pick-up apparatus for picking up an optical image derived from an X-ray image.

2. Description of the Related Act

An image pick-up apparatus of this kind is known from German Offenlegungsschrift DE 33 15 882.

The known image pick-up apparatus forms part of an X-ray examination apparatus. This X-ray examination apparatus comprises an X-ray source and an X-ray image intensifier whereto the image pick-up apparatus is optically coupled An X-ray image is formed of an object, for example a patient to be radiologically examined who is arranged between the X-ray source and the X-ray image intensifier, by irradiating the object by means of an X-ray beam emitted by the X-ray source. The X-ray image is formed on an entrance screen of the X-ray image intensifier and converted into an optical image on an exit window of the X-ray image intensifier. This optical image is picked up by the image pick-up apparatus so as to be converted into an electronic image signal. The light beam emanating from the exit window is split into two sub-beams by means of a beam splitter comprising a partly transparent mirror, said sub-beams carrying sub-images which are picked up by the individual image sensors.

The known image pick-up apparatus comprises two solid-state image sensors, each of which comprises a plurality of photosensitive elements. The image sensors are arranged in such a manner that pixels of the optical image which are picked up by one image sensor are mapped in the spaces between the photosensitive elements of the other sensor. Each image sensor picks up a sub-image and delivers a respective sub-image signal to the combination unit which forms an image signal for a composite image from the sub-image signals. The composite image is composed of image lines of the sub-images which have been picked up by the individual sensors, that is to say in such a manner that image lines from one image sensor constitute the odd image lines in the composite image and image lines from the other image sensor constitute the even image lines in the composite image. In the direction transversely of the image lines, the composite image has a spatial resolution which has been approximately doubled in comparison with the sub-images picked up by the individual sensors.

The known image pick-up apparatus has the drawback that, even when the optical image has a uniform brightness, image lines originating from different image sensors may have different brightness values in the composite image. These differences may be due inter alia to the fact that the individual image sensors receive light from the exit window via different optical paths exhibiting differences in light attenuation. Such differences cause disturbances in the composite image. The composite image may exhibit, for example a streaky pattern which has nothing to do with the image information in the optical image but is caused by differences in the brightnesses of the sub-images.

SUMMARY OF THE INVENTION

An object of the invention is to provide an image pick-up apparatus in which differences between brightnesses of the sub-images are counteracted during the picking up of an image with light which is linearly polarized to a some degree.

This object is achieved in that an image pick-up apparatus in accordance with the invention is characterized in that the image pick-up apparatus comprises a depolarizing element which is arranged in the light beam in front of the beam splitter in order to reduce the linear polarization degree of the light of the optical image.

The depolarizing element reduces the linear polarization degree of the light incident on the beam splitter. As a result, differences between brightnesses of the sub-images are reduced and disturbances in the composite image caused thereby are counteracted. The low linear polarization degree of the light incident on the beam splitter still permissible is dependent on the desired quality of the composite image. If no steps were taken differences would occur in light attenuation in the various optical paths if the light incident on the beam splitter is linearly polarized. The higher the degree of linear polarization, the larger the brightness differences between the sub-images will be, because the degree of reflection of the partly transparent mirror for linearly polarized light differs from the degree of transmission in dependence on the linear polarization degree. The light incident on the beam splitter may be polarized, for example in that a partly transparent mirror is arranged between the beam splitter and the exit window in order to distribute the light from the exit window between several image pick-up apparatus.

A preferred embodiment of an image pick-up apparatus in accordance with the invention is characterized in that the depolarizing element is a quarter-wave plate whose main axis extends neither perpendicularly nor parallel to the polarization direction of the light incident thereon.

A quarter-wave plate is a plate of a doubly refracting crystal of a thickness such that the optical path length difference between the ordinary and the extraordinary ray amounts to exactly one quarter wavelength. The main axis of the quarter-wave plate is the polarization direction of the light of the faster one of the ordinary and the extraordinary beams. Linearly polarized light incident on the quarter-wave plate is converted into elliptically polarized light. Averaged over an optical period, the linear polarization degree of fully or partly polarized light is reduced by the quarter-wave plate. Because the mean linear polarization is averaged out within the particularly short period of time of one optical period, i.e. the period of vibration of the light, light having a low linear polarization degree reaches the partly transparent mirror of the beam splitter and differences between the brightnesses of the sub-images remain small.

A further preferred embodiment of an image pick-up apparatus in accordance with the invention is characterized in that the main axis of the quarter-wave plate encloses an angle of approximately 45° relative to the polarization direction of the light incident thereon.

In the case of such an orientation linearly polarized light incident on the quarter-wave plate is converted into circularly polarized light in which all linear polarization directions occur to substantially the same degree within an optical period. As a result, the linear polarization degree of fully or partly polarized light guided through the quarter-wave plate is negligibly small on average during an optical period. Because linearly substantially non-polarized light is incident on the partly transparent mirror of the beam splitter, differences between the brightnesses of the sub-images remain small.

A further preferred embodiment of an image pick-up apparatus in accordance with the invention is characterized in that the depolarizing element is a Cornu pseudo-depolarizer.

A Cornu pseudo-depolarizer (CPD) comprises two prisms whose oblique sides are arranged one against the other. The prisms consist of an optically active material with opposite directions of rotation of the polarization; for example, one prism consists of left-handed quartz, and the other of right-handed quartz. In both prisms the main axis extends parallel to the propagation direction of the incident light. The rotation of the polarization of the incident light by the CPD is dependent on the position in which the light is incident on the CPD. The linear polarization direction of the light guided through the CPD is dependent on the position within the cross-section of the beam emanating from the CPD and the distance within the cross-section of the emanating beam over which the linear polarization direction is rotated through a substantial angle is much smaller than the diameter of the emanating beam. Averaged over small fractions of this cross-section, the linear polarization degree is reduced in comparison with the polarization degree of the light incident on the CPD. Because light having a low linear polarization degree is incident on the partly transparent mirror of the beam splitter, differences between the brightnesses of the sub-images remain small.

A further preferred embodiment of an image pick-up apparatus in accordance with the invention is characterized in that the depolarizing element is provided with an antireflection layer.

The depolarizing element is provided with an antireflection layer on the side on which the fully or partly linearly polarized light is incident. Further loss of light is counteracted by providing the depolarizing element also with an antireflection layer on the side wherefrom the linearly depolarized light emanates. Because of the antireflection layers, no or hardly any incident light is lost and substantially all light remains available for detection by the image sensors. The sensitivity of the image pick-up apparatus is thus enhanced by application of the antireflection layers.

An X-ray examination apparatus comprising an image pick-up apparatus in accordance with the invention offers the advantage that an X-ray image is converted into an electronic image signal for a composite image of high diagnostic quality in which notably streakiness due to differences in brightness between the sub-images is counteracted. The high diagnostic quality is achieved in that the composite image has a high spatial resolution and contains few disturbances, so that small details of low contrast can be reproduced in a suitably visible manner, for example on a monitor. The radiologist can thus more readily notice small details, such as a tumor in an initial stage of the pathology or a slenotic portion of a bloodvessel.

These and other aspects of the invention will be apparent from and elucidated with reference to the embodiments described hereinafter.

DETAILED DESCRIPTION OF THE PREFERRED EMBODIMENTS

Figure 1:
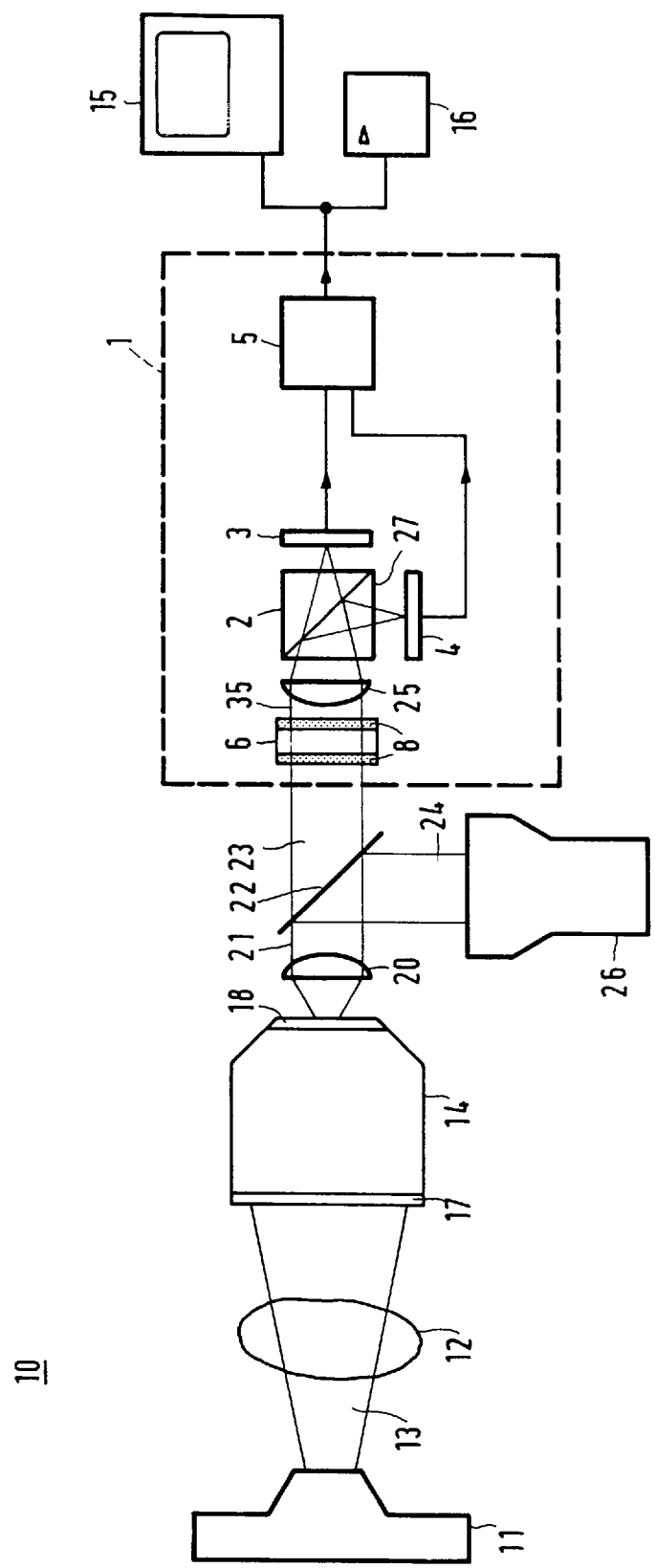
FIG. 1 shows diagrammatically an X-ray examination apparatus comprising an image pick-up apparatus in accordance with the invention.

FIG. 1 shows diagrammatically an X-ray examination apparatus comprising an image pick-up apparatus 1 in accordance with the invention. In order to form an X-ray image of an object 12, for example a patient to be examined, an X-ray source 11 irradiates the patient by means of an X-ray beam 13. Due to differences in X-ray absorption within the patient, an X-ray image is formed and converted into an optical image by the X-ray detector 14. The image pick-up apparatus 1 derives an electronic image signal from the optical image, which electronic image signal is applied to a monitor 15 on which the image information of the X-ray image is displayed. The electronic image signal can also be applied to an image processing unit 16 for further processing.

The X-ray detector 14 is an X-ray image intensifier tube having an entrance screen 17 on which the X-ray image is formed so as to be converted into an optical image on the exit window 18. Using an objective lens 20, a light beam 21 is formed from the light emanating from the exit window. The light image can be formed by way of visible light, but also by way of infrared or ultraviolet light. Via a partly transparent splitting mirror 22, the light beam 21 is split into sub-beams 23 and 24. The sub-beam 24 is guided to a cine camera 26. The sub-beam 23 is focused onto two image sensors 3, 4 by means of a camera lens 25 in cooperation with a beam splitter 2. The image sensors are, for example CCD sensors which comprise a large number of photosensitive elements and which are positioned relative to the beam splitter 2 in such a manner that pixels of the optical image which are mapped on photosensitive elements of one image sensor are mapped in spaces between photosensitive elements of the other image sensor. For example, the individual image sensors pick up alternating bands of the optical image. Each image sensor supplies a respective electronic sub-image signal which contains signal levels representing brightness values in the sub-images. The electronic sub-image signals are combined in a combination unit 5 so as to form an electronic image signal whose signal levels represent brightness values for the composite image. In the direction transversely of the image lines, the composite image has a spatial resolution which has approximately been doubled in comparison with the sub-images picked up by the individual sensors.

The exit window emits substantially non-polarized light. Because the degree of transmission by the splitting mirror 22 is dependent on the linear polarization of the light in the light beam 21, the sub-beam 23 transmitted by the splitting mirror 22 has a given linear polarization. The linear polarization degree of the light in the sub-beam 23 is dependent on the composition of the splitting mirror 22 and amounts to approximately 10%. The light of the sub-beam 23 is distributed between the image sensors 3 and 4 by the beam splitter 2. Between the beam splitter 2 and the splitting mirror 22 there is arranged a depolarizing element 6 which substantially reduces the linear polarization degree of the light reaching the beam splitter 2. The depolarizing element is, for example, a quarter-wave ($\frac{1}{2}\lambda$) plate whose main axis extends at an angle of 45° relative to the polarization direction of the light in the sub-beam 23, so that the quarter-wave plate converts the linearly polarized light into circularly polarized light, and all linear polarization states are sequentially represented to the same extent in the light reaching the beam splitter 2 within an optical period. For the circularly polarized light the difference between reflection and transmission by a partly transparent mirror surface 27 of the beam splitter 2 is smaller in comparison with the difference for polarized light and, moreover, this difference is uniform across the mirror surface 27. The remaining difference, amounting to a few percent in dependence on the composition of the mirror surface 27, between the brightnesses of the sub-images picked up by the individual image sensors 3 and 4 is simply compensated for in the combination unit by suitable amplification, relative to one another, of the electronic sub-image signals supplied by the image sensors 3, 4. The quarter-wave plate is provided with anti-reflection layers 8 on the side facing the image intensifier 14 as well as on its side facing the beam splitter 2, said layers counteracting loss of light intensity due to reflections.

Figure 2:
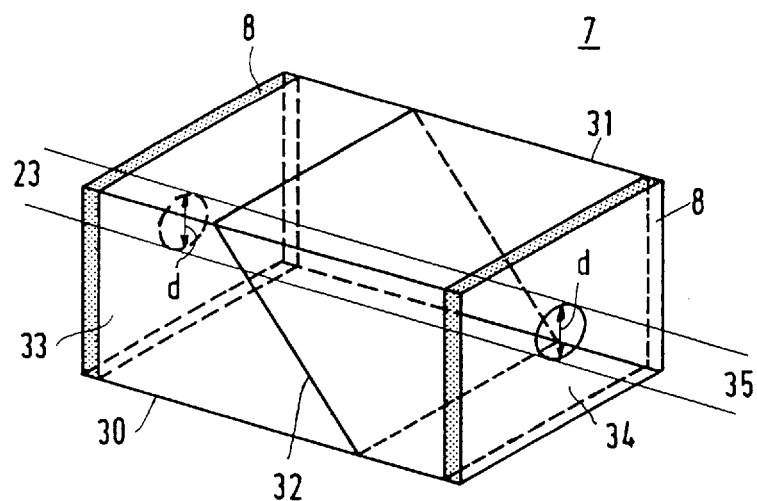
FIG. 2 shows a Cornu pseudo-depolarizer for an embodiment of an image pick-up apparatus in accordance with the invention.

FIG. 2 shows a Cornu pseudo-depolarizer (CPD) 7 for an embodiment of an image pick-up apparatus in accordance with the invention. The CPD consists of two prisms 30, 31 whose oblique sides 32 are cemented against one another. Both prisms 30, 31 consist of an optically active material, for example left-handed and right-handed quartz. One prism (30) consists of left-handed quartz, and the other prism (31) of right-handed quartz. The prisms are arranged in such a manner that the incident sub-beam 23 is incident on a face 33 of the prism 30 which is situated opposite the oblique side 32 and that the emanating light beam 35 leaves the CPD via an exit face 34 of the prism 31 which is situated opposite the oblique side 32. As a result of this geometry, the path lengths travelled by a light ray through the prisms 30, 31 are dependent on the position in which the light beam is incident on the face 33. Because the path lengths through the successive left-handed and right-handed prisms 30, 31 differ for different light rays in the sub-beam 23, the linear polarization in the emanating light beam 35 is dependent on the position in the cross-section of the beam. The linear polarization direction in the emanating light beam 35 varies over short distances within the cross-section of the light beam 35, i.e. the polarization direction is rotated through many times 360° between two extreme positions in the cross-section. Therefore, the polarization degree <p> averaged across the cross-section of the emanating beam is dependent on the diameter d of the cross-section of the incoming sub-beam 23. On the entrance and exit faces 33, 34 there are provided antireflection layers 8 which counteract loss of light intensity of the sub-beam 23 by reflection on the entrance and exit faces 33 and 34. Because of the spatial rapid variations in the polarization directions in the light beam 35, differences between brightnesses in the sub-images formed by the image sensors 3, 4 are counteracted. Within each of the sub-images the CPD induces brightness variations over very short distances. Preferably, these brightness variations are within one or a few photosensitive elements of each of the image sensors.

Figure 3:
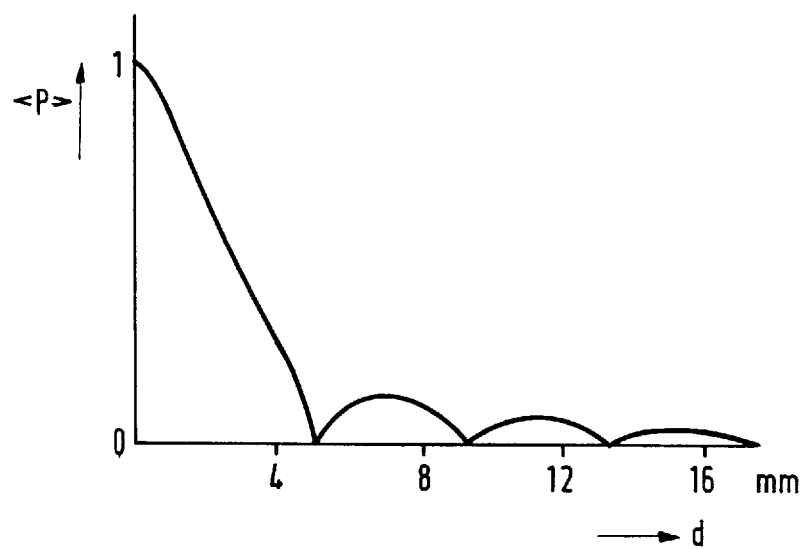
FIG. 3 is a graphic representation of the linear polarization degree of light averaged across the light beam diameter and guided through the Cornu pseudo-depolarizer.

FIG. 3 is a graphic representation of the linear polarization degree <p>, averaged across the beam diameter of light transmitted through the Cornu pseudo-depolarizer, as a function of the diameter d of the cross-section of the light beam. The graph shown relates to a CPD having a length of 15 mm and an aperture of 10 mm×10 mm. When the diameter d amounts to 5.50 mm, the linear polarization degree is exactly zero and when d is larger than 8 mm, the linear polarization degree is less than 0.1. When the diameter of the light beam traversing the CPD is sufficiently large, the mean linear polarization degree of the emanating light beam 35, incident on the beam splitter 2, is low and hence the intensity differences between light incident on one image sensor 3 and light incident on the other image sensor 4 remain small.

I claim:

1. An image pick-up apparatus, comprising:
    a beam splitter for splitting a light beam carrying an optical image into sub-beams carrying sub-images,
    at least two image sensors for deriving electronic sub-image signals from the sub-images,
    a combination unit for combining electronic sub-image signals so as to form an electronic image signal of a composite image, and
    a depolarizing element which is arranged in the light beam carrying an optical image and in front of the beam splitter in order to reduce the linear polarization degree of the light of the optical image reaching the beam splitter.

2. An image pick-up apparatus as claimed in claim 1, wherein the depolarizing element is a quarter-wave plate whose main axis extends neither perpendicularly nor parallel to the polarization direction of the light incident thereon.

3. An image pick-up apparatus as claimed in claim 2, wherein the main axis of the quarter-wave plate encloses an angle of approximately 45° relative to the polarization direction of the light incident thereon.

4. An image pick-up apparatus as claimed in claim 3, wherein the depolarizing element is provided with an antireflection layer.

5. An image pick-up apparatus as claimed in claim 2, wherein the depolarizing element is provided with an antireflection layer.

6. An image pick-up apparatus as claimed in claim 1, wherein the depolarizing element is a Cornu pseudo-depolarizer.

7. An image pick-up apparatus as claimed in claim 6, wherein the depolarizing element is provided with an antireflection layer.

8. An image pick-up apparatus as claimed in claim 1, wherein the depolarizing element is provided with an antireflection layer.

9. X-ray examination apparatus, comprising:
    an X-ray source for irradiating an object by means of an X-ray beam in order to form an X-ray image,
    an X-ray detector for deriving an optical image from the X-ray image,
    means for forming a light beam carrying the optical image,
    a beam splitter for splitting the light beam carrying the optical image into sub-beams carrying sub-images,
    at least two image sensors for deriving electronic sub-image signals from the sub-images,
    a combination unit for combining electronic sub-image signals so as to form an electronic image signal of a composite image, and
    a depolarizing element which is arranged in the light beam carrying the optical image and in front of the beam splitter in order to reduce the linear polarization degree of the light of the optical image reaching the beam splitter.

10. An X-ray examination apparatus as claimed in claim 9, wherein the depolarizing element is a quarter-wave plate whose main axis extends neither perpendicularly nor parallel to the polarization direction of the light incident thereon.

11. An X-ray examination apparatus as claimed in claim 10, wherein the depolarizing element is provided with an antireflection layer.

12. An X-ray examination apparatus as claimed in claim 10, wherein the main axis of the quarter-wave plate encloses an angle of approximately 45° relative to the polarization direction of the light incident thereon.

13. An X-ray examination apparatus as claimed in claim 12, wherein the depolarizing element is provided with an antireflection layer.

14. An X-ray examination apparatus as claimed in claim 9, wherein the depolarizing element is a Cornu pseudo-depolarizer.

15. An X-ray examination apparatus as claimed in claim 14, wherein the depolarizing element is provided with an antireflection layer.

* * * * *